United States Patent
Burruss et al.

(10) Patent No.: US 9,588,799 B1
(45) Date of Patent: Mar. 7, 2017

(54) MANAGING TEST SERVICES IN A DISTRIBUTED PRODUCTION SERVICE ENVIRONMENT

(71) Applicant: Amazon Technologies, Inc., Seattle, WA (US)

(72) Inventors: Brian Todd Burruss, Bainbridge Island, WA (US); John Luther Guthrie, II, Bellevue, WA (US); Marc Stephen Olson, Bellevue, WA (US); Madhuvanesh Parthasarathy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,713

(22) Filed: Sep. 29, 2015

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/455 | (2006.01) |
| H04L 29/08 | (2006.01) |

(52) U.S. Cl.
CPC ...... G06F 9/45558 (2013.01); H04L 67/1097 (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,178,520 B1* | 1/2001 | DeKoning | G06F 3/0607 711/114 |
| 2006/0106819 A1* | 5/2006 | Dhanadevan | G06F 3/0605 |
| 2006/0112247 A1* | 5/2006 | Ramany | G06F 3/0605 711/165 |

* cited by examiner

*Primary Examiner* — Craig Dorais
(74) *Attorney, Agent, or Firm* — Knobbe, Martens, Olson & Bear, LLP

(57) ABSTRACT

Systems and methods are described for a storage processing service that processes multiple storage commands. The storage processing service uses tags from test storage commands to determine whether a test storage service is to be instantiated that reflects a corresponding production service. Test storage commands with the same tag are tested on that test service. Additionally, the storage processing service determines a strategy for testing processes on production services when the storage system is overloaded. In one embodiment, the test service manager can determine to stop testing processes for a period of time, and issue a shed command that queues or sheds test storage commands. Advantageously, a shed command, while active at a storage processing service, may alleviate the overload on production services. The test service manager can continue to monitor the storage system to determine whether the overload continues to exist.

21 Claims, 10 Drawing Sheets

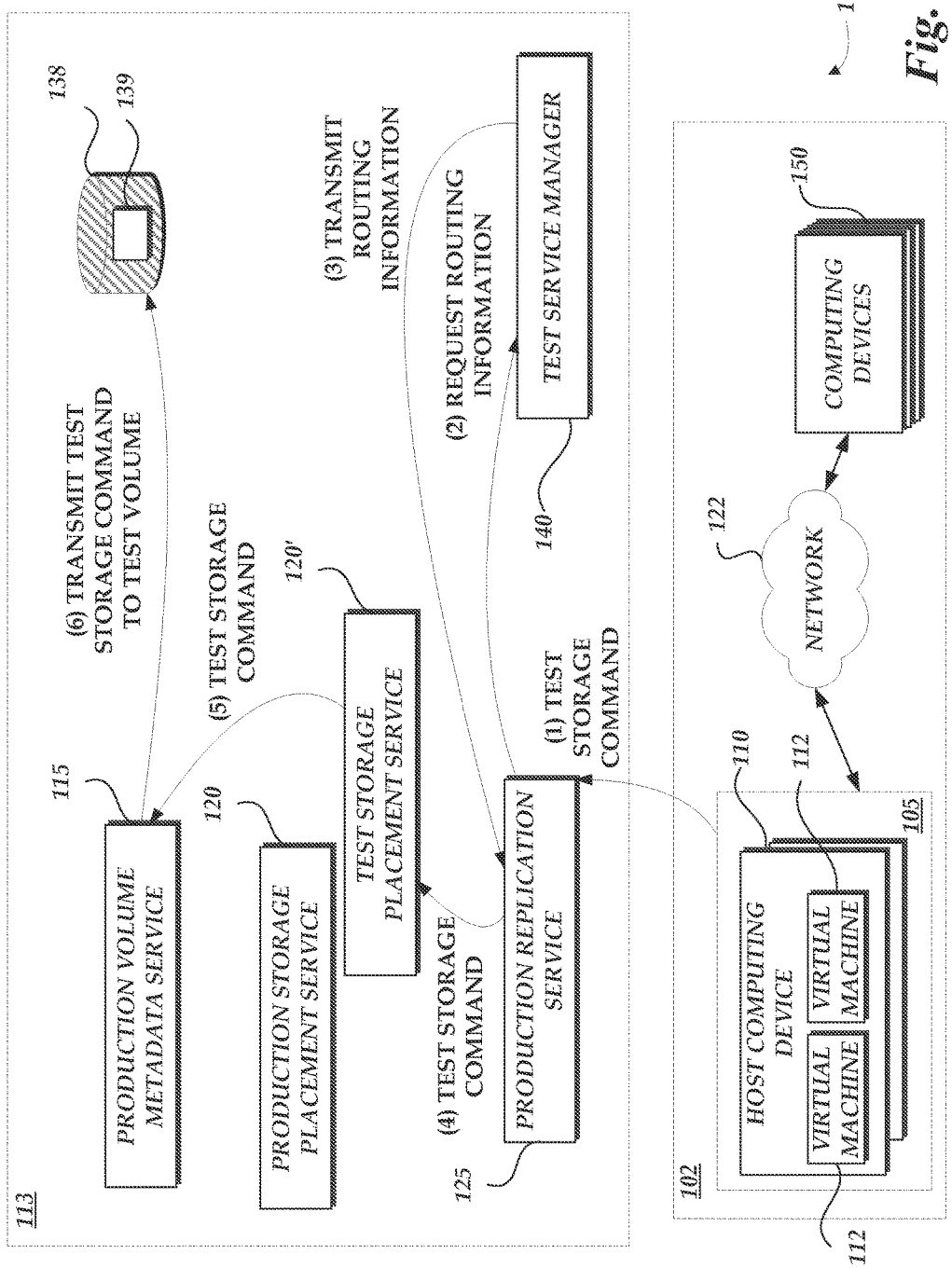

MANAGING TEST SERVICES IN A DISTRIBUTED PRODUCTION SERVICE ENVIRONMENT

BACKGROUND

Generally described, computing devices can utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization.

To facilitate increased utilization of data center resources, individual computing devices within a data center may be configured to provide specific functionality according to the requirements of the data center. Moreover, virtualization technologies may allow a single physical computing device to host one or more instances of a virtual machine (e.g., a virtual machine device), where the virtual machine device instance appears to a user of a data center as an independent computing device. With virtualization, the host computing device can create, maintain, delete, or otherwise manage virtual machine device instances in a dynamic manner. In turn, users can request computing resources (e.g., storage resources) from the data center, including single computing devices or a configuration of networked computing devices, and be provided with virtual machine device instances that provide the requested computing resources. Thus some hosted environments include virtual machine instances that act as computing resources for computing devices (e.g., clients). These virtual machine instances can then use storage resources in the data center.

Such virtual machine instances may also use production services to determine interactions of the storage resources. For example, a virtual machine instance can use a production storage placement service to determine where storage volumes are to be placed in a network for the user of that virtual machine instance for a certain use case of storage resources.

To access these storage resources, the virtual machine instances can send storage commands (e.g., a production service placement command request) that allow the virtual machine instances to configure, access, and communicate with the storage resources. Clients can send storage requests to the virtual machine instances over the communications network. The virtual machine instances, in turn, can also send storage command requests to the storage resources.

BRIEF DESCRIPTION OF THE DRAWINGS

FIG. 3 is a block diagram of the network topology of FIG. 1 illustrating routing of a test storage command through the storage processing service;

DETAILED DESCRIPTION

Figure 1:
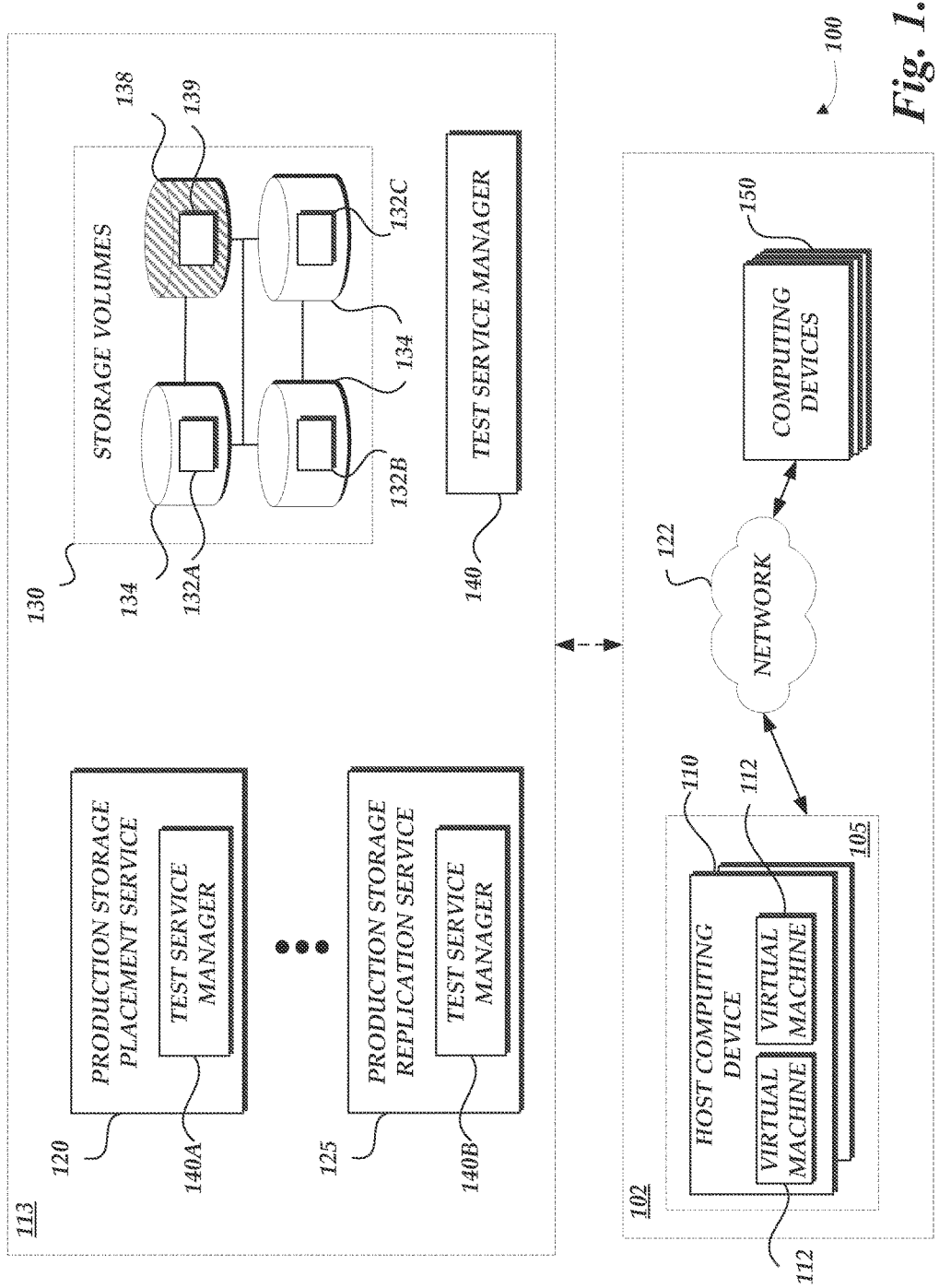
FIG. 1 is a block diagram depicting an illustrative network topology including a storage layer comprising a test service manager and a storage processing service with storage volumes, and a client layer comprising virtual computing device instances, interconnected via a network.

Generally described, the present application relates to production services that are configured to implement various production service commands. More specifically, aspects of the present application relate to production storage services that are configured to implement various storage commands transmitted by a plurality of clients, such as instantiated virtual machine instances. Illustratively, the commands transmitted to the production storage service can correspond to production storage commands transmitted to the production storage service. Additionally, according to the present application, the commands transmitted to the production storage service can also include test service commands that are configured to modify one or more aspects of the services making up the production storage service. A network-based storage service may be hosted in a production service environment and involve a number of different systems, parts, and sub-systems, each of which may include code and processes that may undergo updating, changing, or modifying. For example, updating one part of the network-based storage service may allow for more efficiently handling of storage requests.

In accordance with an aspect of the present application, a production service receives various commands from one or more clients, such as virtual machine instances. The production service analyzes the received commands to determine whether the received commands correspond to production storage commands or test storage commands. For example, a test service manager can facilitate the analysis of the received commands by collecting monitoring information regarding the processing results of the storage commands once processed. As described herein, test storage commands can be routed through a production service environment, without interrupting or impacting the processing of production storage commands executing on those production services. With the system described herein, the execution of test storage commands can be monitored so that production storage command processing remains uninterrupted or unimpacted in a substantial way. In this way, for example, changes to parts of the service, such as changes to a configuration or algorithm, can be tested with test service commands in the actual production environment without adversely impacting actual production load. As used herein, production storage commands and test storage commands can be viewed as a subset of production service commands and test service commands respectively. That is, a production service can process the production service command, or a production storage command. Similarly, a test service can process a test service command, or a test storage command. As will be described illustratively herein, production storage commands and test storage commands can process on production services within the production service environment. In addition, test storage commands may process on test services within the production service environment. Generally described, production service commands and test service commands can process on production services within the production service environment.

In various embodiments of the present disclosure, a production service can use the techniques disclosed herein to process test storage commands in the context of the production storage service. As previously described, when a production service receives a test storage command including an associated test identifier, the production service can determine whether a production storage volume, designated or configured to process test storage commands, is available to handle the test storage command. If a storage volume is available, the production service can route the test storage command to process via a test storage service associated with the test identifier. The storage volume can then be associated with that test storage command and test identifier to process further or subsequent test commands. In various embodiments, the test identifier can be used to identify that a service being tested or a part of a service being tested, for example a change to a configuration, should be used to handle the command, rather than the production service. In such a case, a test service can be instantiated in a production service.

More specifically, storage requests, that may include production storage commands and test storage commands, can indicate that a test service, which includes a variation in processing of a storage commands compared to the production service, should be used to process the storage command. Except for the difference, such as the changed configuration, reflected by the test service, the other parts of handling the storage command are accomplished by production services in the production service environment. For example, an Application Programming Interface ("API") can be used by a data center operator to call test storage commands for processing on production services or test services. Continuing in this example, the data center operator can transmit requests using the test service manager, at the API-level (e.g., an API-level request). A production service determines that a certain test storage command is associated with a test identifier of an API-level request, and subsequently, determines that the test storage command is to be routed to a test service associated with the production service. In another embodiment, the test service is configured, in part, by the API level request. For example, a storage request may be transmitted at the API-level with metadata such as a test identifier, indicating that a test service should be instantiated for processing of certain test storage commands.

In accordance with another aspect, a test service manager monitors network-based storage commands to evaluate the performance of production storage commands and test service commands. For example, a data center operator using a storage network that hosts storage volumes receiving the production and test storage commands can use a test service manager to determine whether to shed test storage commands. If the test service manager determines that an overload exists on production services, test storage commands can be shed to assist in reducing the overload on production services. As used herein, production services can be a service that uses storage volumes to produce storage processing results for some aspect of production in a data center network, for example, provisioning certain storage volumes for use by a customer of the data center.

Further generally described, the present disclosure relates to a test service manager that can use monitoring information (e.g., a storage command metric) to monitor the impact of the test services commands, for example associated with changes to parts of the service, as well as to identify overloads on production services. Illustratively, a storage command metric such as the number of input/output (I/O) operations per second can indicate how fast data is accessed from a storage volume. If data is no longer being accessed at an appropriate rate threshold for production services, the test service manager can determine that a shed command should be issued to the storage processing service. The test service manager can issue the shed command so that any additional test storage commands are shed or queued. Such a shed command can be useful for a storage processing service that experiences peak usage times on production services. For example, at certain times, production storage commands can increase beyond the available capacity of the storage volumes provisioned for both production services and test services. At those times, processing test storage commands may be a lower priority for the data center operator. For example, processing further test storage commands could add a significant overhead, possibly degrading performance by the storage system for production services. In contrast, because production services can reflect actual customer demand for the storage volumes, it may be desirable to shed test storage commands associated with ongoing tests (e.g., tests on storage volumes provisioned for production services).

More specifically, an active shed command issued by the test service manager will result in further test storage commands being shed or queued by the storage processing service. However, production storage commands can still process as usual, and further the overload on production services may decrease as a result of only production storage commands being processed. While the shed command is active, the test service manager can continue to receive further monitoring information collected by the storage processing service and further analyze that monitoring information to determine whether an overload continues to exist on production services.

The foregoing aspects and many of the attendant advantages will become more readily appreciated as the same become better understood by reference to the following description of illustrative embodiments, when taken in conjunction with the accompanying drawings depicting the illustrative embodiments. The illustrative embodiments described below do not necessarily imply that any combination of features is required. Additionally, in some embodiments, the features of the illustrative embodiments can be combined.

FIG. 1 is a block diagram depicting an illustrative network topology 100 comprising a client layer 102 and a storage layer 113. The client layer 102 includes multiple host computing devices 110 with multiple sets of client computing devices 150 that communicate with the virtual machines 112 via network 122. Illustratively, the client computing devices 150 can use virtual machines 112 to access storage volumes 134 via network 122. The client layer 102 can also interact with the storage layer 113 via network 122. Illustratively, virtual machines 112 can communicate via network 122 to the storage layer 113. For example, a virtual machine 112 can communicate with a storage network 130 for accessing of a specific storage volume 134. Accordingly, a storage volume 134 can be provisioned for attachment to virtual machines 112 as storage resource for a client computing device 150. Viewed from this perspective, a user or customer can use a client computing device 150 to access a storage volume 134. As will be described below, interactions with storage volumes of storage network 130 can be used by customers or users to conduct tests on the storage network 130. Test service manager 140, 140A, 140B can designate or tag certain storage volumes of storage network 130 as test storage volumes, for example, test storage volume 138.

Client computing devices 150 may generally include any computing device receiving the storage networks provisioned through virtual machines 112 to the storage network 130. While the term "client" is used in reference to client computing devices 150, client computing devices 150 should not be construed as limited to end user computing devices. Rather, client computing devices 150 may include end user devices, devices owned or operated by other service providers, or devices owned or operated by an administrator of host computing devices 110 (e.g., a data center operator). Examples of client computing devices 150 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The network 122 is operable to enable communication generally between the client layer 102 and the storage layer 113. The network 122 can also enable communication between various components of the network topology 100 such as communication between the host computing devices 110, storage network 130, storage volumes 134, client computing devices 150, and the test service manager 140, 140A, 140B. The network 122 may be, for instance, a wide area network (WAN), a local area network (LAN), or a global communications network. Network 122 can enable communication between any component depicted in network topology 100, whether that component is part of a storage layer 113 or a client layer 102.

The illustrated network topology 100 further includes a number of storage volumes 134 in a storage network 130 within storage layer 113. Generally, a storage volume 134 may correspond to a hard disk drive, network accessible storage, or any other type of perpetual or substantially perpetual storage. For example, the storage volumes 134 of FIG. 1 may correspond to network accessible storage devices. Though depicted as external to client computing devices 150, in some embodiments, storage volumes 134 may be internal to a specific client computing device 150. Storage volumes 134 can be used for production services such as production storage placement service 120 and the production replication service 125.

For purposes of illustration, the storage network 130 also contains a production volume that has been configured, at least temporarily, as a test storage volume 138. Test storage volume 138 is stored in the storage network 113 with storage volumes 134. Test storage volume 138 is accessible by production services for testing of test storage commands. As previously described, the test storage volume 138 corresponds to a production volume that has been instantiated for purposes of implementing one or more test storage commands. Illustratively, the test storage volume 138 may be configured solely to implement test storage commands. Test storage volume 138 can be associated with a test identifier that identifies test storage volume 138 as a storage volume configured for tests associated with that test identifier. For example, a test identifier can be stored in the metadata associated with test storage volume 138. In various embodiments, identifying a storage volume as a test storage volume 138 can be referred to as tagging a storage volume with a test identifier. As used herein, a test identifier can indicate that a certain test is to be performed with the storage commands, if the test storage command is associated with that test identifier; or that the test is to be performed on test storage volumes, if the test storage volume is associated with that test identifier. Test identifiers can also indicate a test associated with a certain customer or user of the storage network 130 or the storage layer 113. For example, a client computing device 150 can initiate requests for a test that host computing device sends to storage layer 113 as test storage commands. Illustratively, a customer operating a client computing device 150 can use an Application Programming Interface ("API") to initiate or call test storage commands for processing on storage layer 113 and the components therein, for example, the test storage placement service. In this example, the test service manager 140A can associate such test storage commands with a specific test identifier. For example, a specific API may be associated with the test identifier. As will be described below, test service manager 140, 140A, 140B can associate or tag storage volumes in storage network 130 with certain test identifiers.

Storage volumes 134 also contain agents 132A-132C that can be configured to collect storage command metrics regarding storage commands (e.g., a production storage command), process the storage command, and subsequently send the storage command metrics to the test service manager 140, 140A, 140B. Agents 132A-132C can collect and aggregate storage command metrics sent to storage network 130 by virtual machines 112 or processed on storage network 130. The agent can aggregate storage command metrics from the various storage commands processed on the storage volumes 134. Because an agent 132A-132C can aggregate metrics where the storage command requests are being processed, real-time storage command metrics can be provided to the test service manager 140, 140A, 140B.

More specifically, agent 132A (or agents 132B, 132C) processes storage command and collects storage command metrics regarding storage command from the virtual machines 112 accessing storage volumes 134. Collected storage command metrics can be referred to as monitoring information. Storage command metrics can various metrics that measure the performance of performing certain storage commands or measure the performance of a certain storage volume 134. As one example, a storage command metric can be a rate of processing production storage commands on production storage volumes. Agents 132A-132C can collect such a metric by a rate of I/O write requests, I/O read request, or any other request that can indicate a rate of processing on a production storage volume. As another example, a storage command metric can be an indication of an idle state of a storage volume 134, or the absence of processing storage commands on storage volume 134.

Various metrics can be collected by agents 132A-132C, including, but not limited to: the number of read I/O operations per second; the number of write I/O operations per second; the server service time; read latency; write latency; the number of errors or flags for storage volumes that indicate errors during processing; the number of storage volumes in use by count; the number of storage volumes in use by memory; the number of active storage volumes; the number of storage servers in use; the amount of memory read (e.g., size of I/O reads) for a particular storage volume or several storage volumes; the amount of memory written to a storage volume (e.g., size of I/O writes) for a particular storage volume or several storage volumes; the queue length of a storage volume; the hardware diagnostics (e.g., disk usage, CPU & memory utilization) for a particular storage volume; the network diagnostics (e.g., number of hops, latency) for a particular storage volume; the percentage of use for I/O operations at a particular storage volume; and the percentage of time that a particular partition on a particular storage volume is used. As can be seen from this description, various storage command metrics are possible.

Further, in other embodiments that are not illustratively depicted in FIG. 1, agents 132A-132C may reside on one of the host computing devices 110 or across several hosts of host computing devices 110. As an example, in one embodiment, agents 132A-132C can be instantiated as part of a virtual machine 112. In such an embodiment, virtual machine 112 can receive storage command metrics for storage commands sent by virtual machine 112. In some embodiments, the storage command metrics can be sent with storage command processing results that storage volume 134 processes in response to the storage command requests sent by virtual machine 112. Virtual machine 112 can provide the storage command metrics as monitoring information to test service manager 140, 140A, 140B. As one skilled in the art may recognize, agents 132A-132C can be configured to operate on any network entity associated with network 122. For example, agents 132A-132C may be configured to operate on a single computing device (e.g., a storage server) or several multiple computing devices in communication with one another.

Storage network 130 can provide storage command metrics as monitoring information, in some embodiments stored within storage network 130, to the test service manager 140, 140A, 140B for further analysis (e.g., analyzing the monitoring information to identify an overload on production services). Test storage volume 138 also contains agent 139 that can be configured to collect test storage command metrics regarding test storage commands, process the test storage commands, and subsequently send the test storage command metrics to the test service manager 140, 140A, 140B. Test storage volume 138 can be configured to operate substantially like storage volume 134. Agent 139 can be configured to operate substantially like an agent 132A-132C. In one embodiment, a host computing device 110 may include a single computing device (e.g., a server). Similarly, storage network 130 may include a single computing device (e.g., a storage server).

In various embodiments, a host computing device 110 may include multiple computing devices in communication with one another, collectively providing a production service to the client computing devices 150. And again similarly, the storage network 130 contains several storage volumes 134 existing as physical devices and communicating over a network to each other. A hosted computing environment 105 of host computing devices 110 may also be referred to as a cloud computing environment. In embodiments not depicted, production services such as production storage placement service 120 can reside on a host computing device 110 of the hosted computing environment 105.

Storage layer 113 also includes various production services such as production storage placement service 120 and production replication service 125. Various other storage production services can be included in storage layer 113 (as indicated in FIG. 1 with ellipsis indications between production storage placement service 120 and production replication service 125). With the production services, storage network 130, and test service manager 140, 140A, 140B, storage layer 113 can also be referred to as a storage processing service. In various embodiments, not depicted in FIG. 1, production services can be located on a host computing device 110.

Generally described, production services can correspond to a service that uses storage volumes for production of storage processing results for some aspect of production in a data center network. For example, a production service can be a production storage volume metadata service that specifies what metadata may be transmitted to a storage volume in a storage command or what metadata may be transmitted by a storage volume in a storage command processing result. Generally, a production service can be any storage service that uses a storage volume for processing of a storage command. A production service can be configured to route storage command through other production storage services for further processing of the storage command. As one example, a storage command can first be processed by a production storage placement service that allocates a portion of a storage volume for processing of that storage command, and, subsequently, the storage command can be routed to a production storage replication service that replicates the allocated portion at another storage volume for redundancy of storage command processing. In this example, when the storage command is processed at the originally allocated volume, a storage command processing result can be routed to the production storage replication service to replicate that storage command processing result at the replicated allocated portion.

Each production service can have a corresponding test service that is instantiated based on a test storage command or instantiated based on a test identifier indicating that such a corresponding test service should be instantiated for processing of test storage commands with that same identifier. As one example, a test service can be instantiated for a particular customer having a particular test identifier. In various embodiments, multiple test services can be instantiated for a particular customer having a certain test identifier. That is, the test identifier can be associated with processing on a specific production services. Accordingly, corresponding test services can be instantiated associated with that test identifier for test storage commands to be executed on those test services.

As will be described with reference to FIGS. 2-4E, production services can process production storage commands and, in some cases, can process test storage commands. Production services can interact with test service manager 140, 140A, 140B via network 122. Or in other embodiments, production services can interact with test service manager 140, 140A, 140B via a local storage network. For example, as depicted test service manager 140A may reside on the production storage placement service 120; and test service manager 140B may reside on the production storage replication service 125. In various embodiments, each production service may include a test service manager. Additionally, the test service manager may operate as a standalone component as the depicted test service manager 140 within the storage layer 113. In other embodiments, the test service manager 140, 140A, 140B may operate collectively communicating via network 122.

The test service manager 140, 140A, 140B receives monitoring information from storage network 130. For example, agents 132A-132C collects monitoring information from the storage commands processed by storage network 130 and can transmit that collected monitoring information to test service manager 140, 140A, 140B. In other embodiments, test service manager 140, 140A, 140B can receive monitoring information from another storage center network, a database, an archive, or any other network entity capable of providing storage command metrics. Generally, test service manager 140, 140A, 140B is used to run tests on storage network 130.

Generally, the test service manager 140, 140A, 140B can correspond to a hard disk drive, network accessible storage, or any other type of perpetual or substantially perpetual storage accessible by one of the virtual machines 112. For example, the test service manager 140, 140A, 140B of FIG. 1, in some embodiments, corresponds to a network accessible storage server. Further, in other embodiments that are not illustratively depicted in FIG. 1, test service manager 140, 140A, 140B may reside on one of the host computing devices 110 or across several hosts of host computing devices 110. As one skilled in the art may recognize, test service manager 140, 140A, 140B can be configured to operate on any network entity associated with network 122. For example, test service manager 140, 140A, 140B may be configured to operate on a single computing device (e.g., a storage server) or several multiple computing devices in communication with one another. As another example, the test service manager 140, 140A, 140B can be configured to operate and be considered, at least logically, to be part of storage network 130. Components and attributes of the test service manager 140, 140A, 140B are further described below with respect to FIGS. 2-5.

Figure 2:
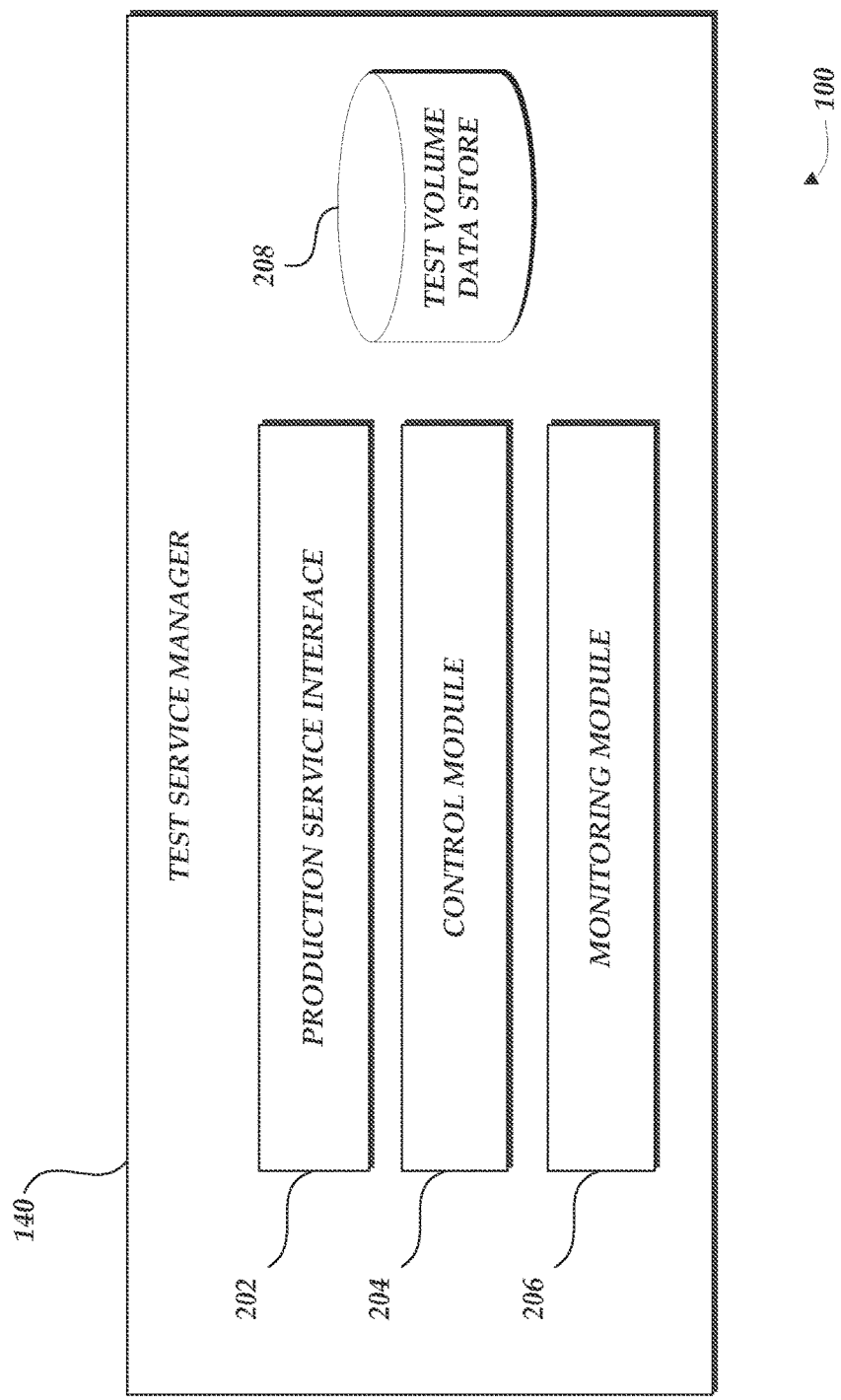
FIG. 2 is a block diagram depicting illustrative components of a test service manager within the network topology of FIG. 1.

FIG. 2 is a block diagram depicting illustrative components of a test service manager 140 included within the network topology of FIG. 1. Test service manager 140A and test service manager 140B may include substantially similar components as described now with reference to FIG. 2. The test service manager 140 includes a production service interface 202 for receiving monitoring information. In various embodiments, the monitoring information is received by production service interface 202 from the storage network 130. In other embodiments, the monitoring information can be received by production service interface 202 from other network entities in network 122. For example, production service interface 202 can receive monitoring information from a virtual machine 112 that has been instantiated an agent 132A. The test service manager 140 further includes a monitoring module 206, which uses the monitoring information to identify a storage traffic overload on the storage processing service. The test service manager also includes a control module 204 that can use obtained monitoring information to determine a strategy for any test storage commands and any test storage volumes. The monitoring information can be stored in test volume data store 208, also included in test service manager 140.

The test volume data store 208 can include data about tests and/or storage volumes 134, including, but not limited to: an ID for a storage volume, a partition ID(s) for a storage volume, an account for a storage volume (e.g., a customer account associated with the storage volume); a type of storage volume, test identifiers, metadata associated with test identifiers (e.g., metadata associated with a test storage command). As an example, test volume data store 208 can include a look-up table that associates a test identifier with certain storage volumes. If a storage volume in storage network 130 has such an association with a test identifier, it can be referred to as a test storage volume 138. Control module 204 can modify and/or update test volume data store 208 in response to monitoring information received from monitoring module 206. For example, the control module 204 may receive an indication from monitoring module 206 that a traffic storage overload exists, and, in response, modify the look-up table by removing storage volumes from that look-up table. Continuing in this example, control module 204 can indicate in a shed command that the storage volumes removed from the look-up table are now available to be used in storage network 130 as production storage volumes. As will be described and illustrated in FIG. 4C (e.g., with the removal of the shaded portion from storage volume 138), a test storage volume 138 can be used a production storage volume.

Illustratively, the control module 204 and the monitoring module 206 may include a number of hardware and software components. More specifically, the control module 204 and the monitoring module 206 may include hardware, software, configuration data, data structures, computer-readable code, or any type of information that can be loaded into memory and processed or published by the control module 204 and the monitoring module 206 respectively. Aspects of the control module 204 and the monitoring module 206 will be described in further detail below with respect to FIG. 3-4E that illustrate test service manager 140, among other actions, analyzing monitoring information to identify a storage traffic overload and transmitting a command to shed any test storage commands. In various embodiments, reference to the test service manager 140 within the present disclosure may include multiple computing devices working in conjunction to facilitate the processing of test storage commands on a storage processing service. For example, in various embodiments, the test service manager 140 may be distributed through a network or implemented by one or more virtual machine device instances.

The production service interface 202 may refer to a physical communication interface on a physical computing device. The production service interface 202 may be an electrical communication interface, an optical communication interface or other type of interconnect interface known in the art. The production service interface 202 may be configured to provide communications between units within the test service manager 140 (e.g., the metric processing component 206) and the virtual machine instances 112 hosted on host computing devices 110. Illustratively, the configuration of the production service interface 202 may be optimized based on specific criteria, such as low latency, high speed, and high bandwidth, among others. In some embodiments, the interconnect interface may correspond to a high speed serial computer expansion bus, such as a Peripheral Component Interconnect Express (PCIe) bus. One skilled in the relevant art will appreciate that the production service interface 202 may incorporate alternative or additional standard interconnect interfaces well known to those skilled in the art.

With reference now to FIG. 3, the interaction between various components of the network topology 100 of FIG. 1 will be illustrated. As illustrated in FIG. 3, an embodiment is depicted where the test service manager 140 is implemented as a centralized stand-alone component of the storage layer 113. For purposes of the example, however, the illustration has been simplified such that many of the components utilized to facilitate communications are not shown.

Additionally, the implementation of a stand-alone component may include implementation on multiple computing devices. For example, in this embodiment, test service managers 140A, 140B are not necessary for the interaction to occur. One skilled in the relevant art will appreciate that such components can be utilized and that additional interactions would accordingly occur without departing from the spirit and scope of the present disclosure.

FIG. 3 is a block diagram of the network topology of FIG. 1 illustrating routing of a test storage command through the storage processing service. As illustrated in FIG. 3 at (1), routing of a test storage command begins with a test storage command (e.g., a test storage replication request) sent from host computing device 110. The test storage command can have a test identifier associated with it. For example, the test storage command may have metadata that indicates a test identifier. Such a test identifier can indicate an ongoing test for a customer. In some embodiments, the test identifier can be referred to as a tag, for example, a customer can tag a test storage command. Generally, a test storage command can include a test identifier that has been associated with that test storage command by a third-party, another storage service, or an external service. As another example, an application programming interface ("API") can be used to tag test storage commands. For example, an API-level request can be sent to the storage processing service indicating that a particular test storage command (or a set of test storage commands) is to be associated with a test identifier. Such an API-level request can be referred to as tagging the test storage command. In various embodiments, customers of the storage processing service may have respective APIs that can allow access to the storage processing service and, thus, allow customer-specific tagging of test storage commands.

The test storage command is sent to production replication service 125 in storage layer 113 via network 122. Production replication service 125 can determine that a routing table for a test storage command does not exist at production replication service 125. In such a case, at (2), production replication service 125 transmits a request for routing information to test service manager 140. Test service manager 140 can retrieve such routing information from test volume data store 208, for example, in a look-up table indicating a test service associated with the same test identifier as the test storage command.

In various embodiments, test service manager 140 can employ routing rules to determine the routing information for the test storage command. From one perspective, when test service manager 140 receives a test storage command, a routing rule can exist that indicates an override to a normal route for a storage command. In such a case, the test service manager 140 can determine that a test service is to be used for processing the test storage command, and indicate an appropriate route to a test service. Such an indication can be included in the routing information.

At (3), test service manager 140 can transmit the obtained routing information to the product replication service 125. With this routing information, product replication service can route test storage command, at (4), to a test service. As depicted, the test storage command is routed to a test storage placement service 120'. In various embodiments, test service manager 140 can instantiate a test storage service that reflects the functionality of a substantially similar production service. The test service manager 140 may instantiate such a test service specifically for ongoing tests by users or customers of the storage layer 113. In this example, test storage placement service 120' reflects a test service that is substantially similar to production storage placement service 120. For the test storage placement service 120' to process the test storage command, test storage placement service 120' can determine that a route to test storage volume 138 is via production volume metadata service 115. Because test storage placement service 120' is a reflection of production storage placement service 120, test storage placement service 120' can determine the route to production volume metadata service 115 without requesting information from test service manager 140. Accordingly, at (5), the test storage placement service 120' transmits the test storage command to production volume metadata service 115. Thereafter, at (6), production volume metadata service 115 transmits the test storage command to test storage volume 138 for processing of the test storage command. While this embodiment depicts test storage command being routed through production volume metadata service 115, it can be appreciated that various other routes to process test storage command on test storage volume 138 are possible. For example, the test storage placement service 120' can transmit the test storage command directly to test storage volume 138 if such a routing information exists at test storage placement service 120'.

As depicted in FIG. 3 as an example of routing the test storage command, a test storage command may only be routed through one test storage service (as depicted, test storage placement service 120'). Generally speaking, a test storage command can be routed through a production storage environment, as depicted in storage layer 113, without interrupting or causing substantial delay to the processing of production storage commands. For example, production storage commands can also be processed simultaneously at production replication service 125, while the production replication service 125 determines at (4) that the test storage command is to be routed to the test storage placement service 120' based on the routing information from the test service manager 140. Continuing in this example, while the production replication service 125 is awaiting the routing information from the test service manager 140, a production storage command can be propagated through the production replication service 125 to be further processed on additional production services within the storage layer 113. In various embodiments, the test storage command can be also processed on the other production services within storage layer 113. For example, the test storage command may indicate via a test identifier that testing is only for a specific test service (as depicted, test storage placement service 120').

As another example of variations in routing the test storage command, the test storage placement service 120' may include a variation in the placement service algorithm as compared to the production storage placement service 120. The test storage command may be routed to the test storage placement service 120' to test specifically that variation in the placement service algorithm. For example, an API-level request having a test identifier can indicate that a customer has varied the placement service algorithm, with the test service manager 140 or production storage placement service 120 determining that a test storage placement service 120' is to be instantiated based on the test identifier. In such a case, the test storage command can also be processed by the production replication service 125 and the production volume metadata service 115 as those production services currently exist, while processing the test storage command on the test storage placement service 120' to determine what effect the variation in the placement algorithm has on processing the test storage command. As can be seen from this example, the test storage command may also be processed by additional production services, rather than test services alone. Accordingly, a test storage command can be routed through the storage layer 113, concurrently with processing of various production or test services, without impacting or interrupting the processing of production storage commands on the respective production services.

Not depicted in FIG. 3, the test service manager 140 can also assist in routing asynchronous test storage commands. For example, the test service manager 140 can monitor the context of the storage layer 113 to determine where test storage commands should be routed to accomplish a test. As one example, the test service manager 140 can determine that a set of test storage commands should be routed to a different production service because the normal routing for those test storage commands is unnecessary for the test associated with those test storage commands (e.g., as indicated by the test identifier). In such a case, the test service manager 140 can determine that the test storage commands should be routed to a different test service, and provide that routing information to the production service requesting that routing information. In some cases, the routing information can be provided proactively to a production service if the context indicates that asynchronous processing of test storage commands is occurring more quickly than routing requests can be handled by the test service manager 140.

With reference now to FIGS. 4A-4E, the interaction between various components of the network topology 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Additionally, various embodiments of the test service manager 140, 140A, 140B will be disclosed. One skilled in the relevant art will appreciate that will reference may be made to a specific embodiment of the test service manager, for example, as test service manager 140 or test service manager 140A, any test service manager, as described herein, can be configured to operate as illustratively depicted. Accordingly, while FIGS. 4A-4E may refer to test service manager 140A, test service manager 140 or test service manager 140B may also perform similar operations and have substantially the same functionalities.

Figure 4A:
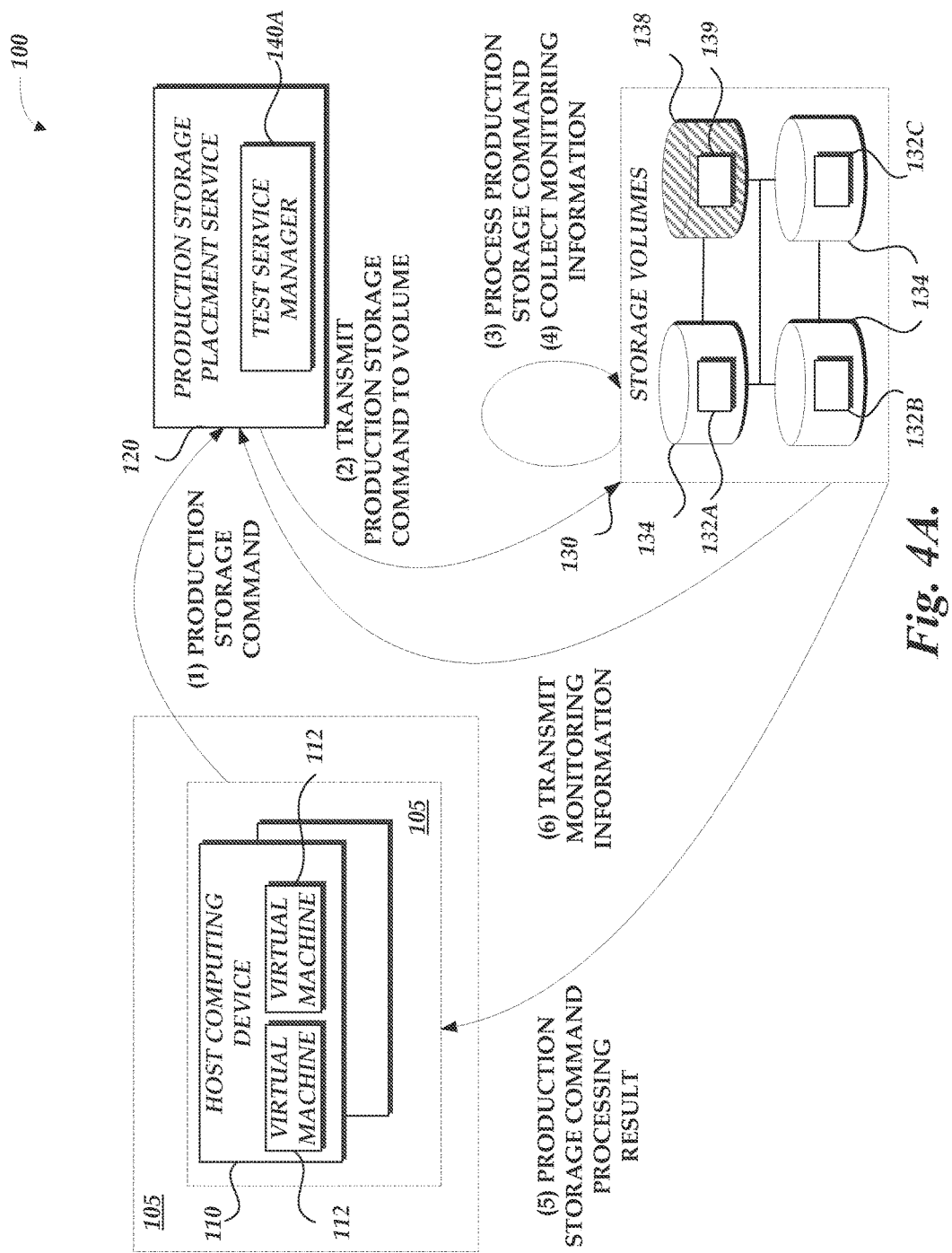
FIG. 4A is a block diagram of the network topology of FIG. 1 illustrating transmission of and processing of a production storage command in the storage processing service.

FIG. 4A is a block diagram of the network topology of FIG. 1 illustrating transmission of and processing of a production storage command in the storage processing service. As illustrated in FIG. 4A at (1), a production storage command is sent from host computing device 110. In this example, the production storage command is sent to the production storage placement service 120 for processing. As described above, various production storage services are possible for processing of production storage commands. The example illustrated here is not intended to limit the production storage command to processing only on a production storage placement service 120.

Storage commands can be both production storage commands and test storage commands. Generally speaking, a storage command may be any command or request for a storage volume 134 that uses the storage volume in some way. For example, in one embodiment, the storage command request corresponds to a data backup request. Or, as another example, a storage command can be an I/O replication request that includes a read to a master storage volume and a write to slave storage volume. As another example, a write I/O storage command request can include two portions: a local write to a storage volume 134 and a remote write to another storage volume 134. Various storage commands are possible.

At (2), production storage placement service 120 transmits the production storage command to a production storage volume in storage network 130. Production storage placement service 120 can use the production storage volume for a production purpose (e.g., portioning of storage volumes). At (3), storage network 130 processes the production storage command. A production storage command may require processing on multiple storage volumes 134 or a single volume 134. In some cases, the storage network 130 can determine the storage volume 134 to process the production storage command. In other cases, the production storage command can include header information indicating the storage volume 134 to process the storage command. However, because test service manager 140A has not designated production storage command with a test identifier, storage network 130 may not use test storage volume 138 to process production storage command.

Next, at (4), storage network 130 collects monitoring information based on the storage commands processed. For example, storage command metrics can be used to obtain monitoring information. As one example of monitoring information collected, a storage command metric can be collected that reflects the number of I/O read operations performed can be counted, whether successful, aborted, or failed. In some embodiments, storage network 130 uses the storage command processing results to collect monitoring information (e.g., counting the number of successful I/O read operations at a particular storage volume 134). As described above with reference to FIG. 1, agents 132A-132C can be used to collect storage command metrics to be used as monitoring information. As one example, a storage command metric can be a rate of processing production storage commands on production storage volumes.

At (5), storage network 130 transmits the production storage command processing result to the host computing device 110. In some embodiments, this can be viewed as a response to the storage command sent at step (1) by the host computing device 110. Accordingly, the production storage command processing result can be directed to that virtual machine 112 that originally sent the storage command. As but one example, if an I/O read storage command was originally sent by virtual machine 112, the production storage command processing result can be the data that was read from storage volume 134; or, in another embodiment, the production storage command processing result can be an acknowledgement that the I/O read storage command was performed.

At (6), storage network 130 transmits the monitoring information to test service manager 140A. This can also be referred to as test service manager 140A obtaining the monitoring information. In other embodiments not depicted, test service manager 140A can obtain monitoring information from test volume data store 208 or any other network entity within network 122. Test service manager 140A obtains the monitoring information necessary to process the storage command metrics, which will be used to analyzing monitoring information to identify a storage traffic overload on storage production services such as production storage placement service 120. In some embodiments, test service manager 140A can obtain monitoring information independent of any storage command processing result. For example, even though no I/O process is being executed on a storage volume 134 in response to a storage command request, agents 132A-132C can collect monitoring information regarding other aspects of a storage volume 134. As but one example, monitoring information can be obtained from storage network 130 indicating an idle state of a storage volume 134. In such a case, a storage command is not necessary to collect monitoring information regarding the idle state of a storage volume 134.

Figure 4B:
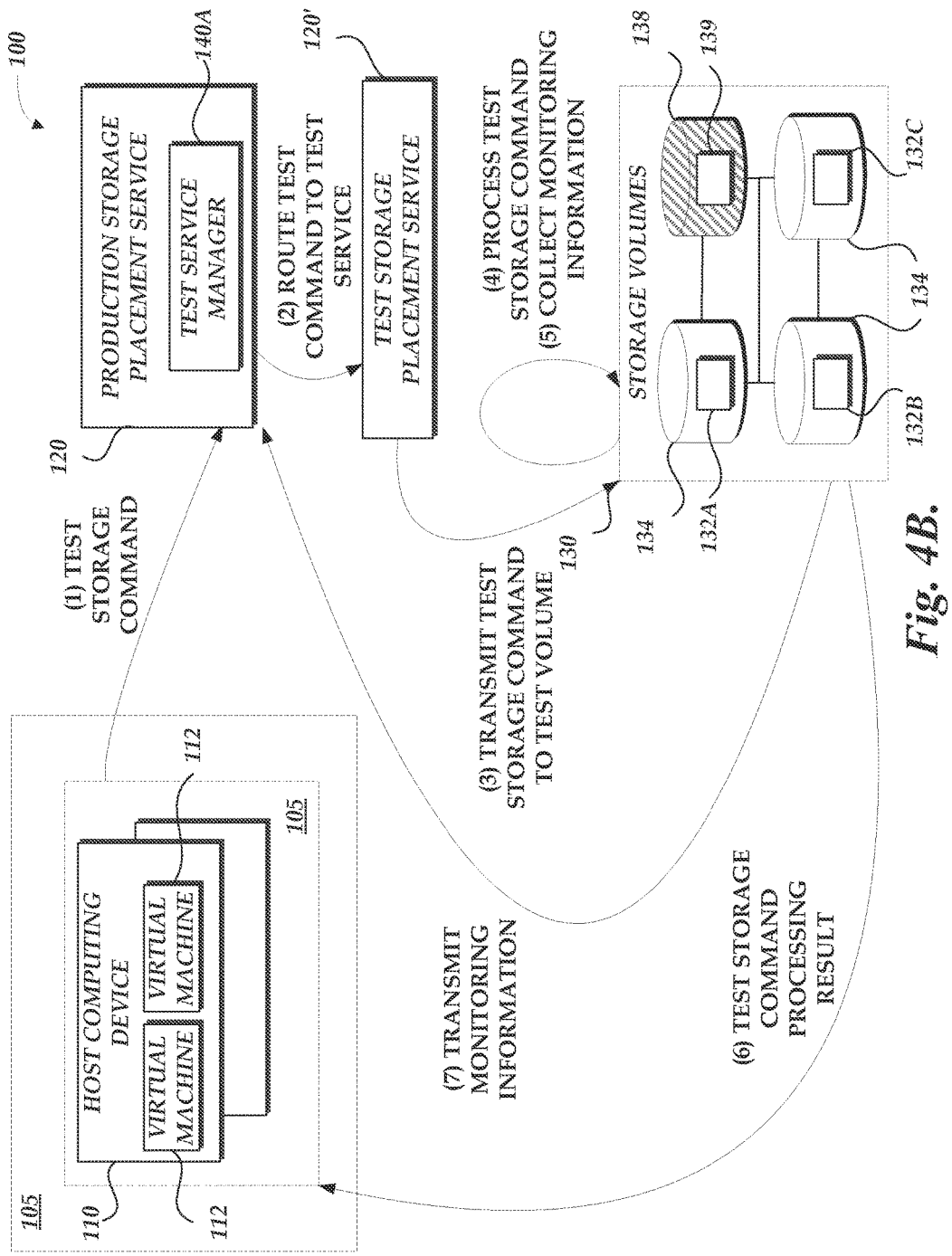
FIG. 4B is a block diagram the network topology of FIG. 1 illustrating transmission of and processing of a test storage command in the storage processing service.

FIG. 4B is a block diagram the network topology of FIG. 1 illustrating transmission of and processing of a test storage command in the storage processing service. As illustrated in FIG. 4B at (1), a test storage command (e.g., a test storage placement request) is sent from host computing device 110. In this example, the test storage command is sent to the production storage placement service 120 for processing. As described above, various test storage commands are possible for processing of test storage commands. For example, the test storage command may be associated with a certain test identifier, where the test identifier indicates a test for a particular customer or user of the host computing device 110.

At (2), production storage placement service 120 routes the test command to a test storage placement service 120'. As described above with respect to FIG. 3, the production storage placement service 120 may route the test storage command to a test service in accordance with routing information from the test service manager 140A. As but one example of this routing process not depicted in FIG. 4B, test service manager 140A can receive a routing request for a test storage command from the production storage placement service 120 (or more generally speaking, the storage layer 113). The test service manager 140A can determine that the test storage command is associated with a test identifier. With the test identifier, test service manager 140A can further determine that the test storage command is to be routed to a test service associated with the production service. As described above, a test service can have functionality substantially similar to a similar production service. Continuing in this example, test service manager 140A can transmit routing information for the test storage command to be processed by the test service. For example, the routing information can indicate that a test storage volume is to process the test storage command. Or in other embodiments, the test service manager 140A can determine that the storage processing service does not include any test storage volume that is associated with the test identifier. In such a case, the routing information can indicate that a production storage volume is to process the test storage command on a production storage volume. In various embodiments, test storage placement service 120' can use the routing information to appropriately process the test storage command for transmission to a test storage volume 138. Accordingly, as depicted in this illustrated embodiment at (3), test storage placement service 120' transmits the test storage command to a test storage volume 138. Test storage placement service 120' can use the test storage volume for a test purpose (e.g., test portioning). The example illustrated here is not intended to limit the test storage command to processing only on a test storage placement service 120.

At (4), storage network 130 processes the test storage command. A test storage command may require processing on a test storage volume 138 or multiple test storage volumes 138 (not depicted in FIG. 4B). In some cases, the storage network 130 can determine the storage volume 134 to process the test storage command. In other cases, the test storage command can include header information indicating the storage volume 134 to process the storage command. In some cases, this header information can correspond to the routing information provided by test service manager 140A. Accordingly, the routing information can indicate that the test storage command may process on a production storage volume 134, rather than a test storage volume 138. As described above at (3), the determination by the test storage manager 140A may depend on a test identifier associated with the test storage command.

Next, at (5), storage network 130 collects monitoring information based on the test command processed. For example, storage command metrics can be used to obtain monitoring information. As described above with reference to FIG. 1, agents 139 can be used to collect storage command metrics to be used as monitoring information. Or in other embodiments, if test storage commands are executing on production storage volumes 134, agents 132A-132C can be used to collect monitoring information regarding the processing of a test storage command on production storage volumes 134. As one example of monitoring information collected, a storage command metric can be collected that reflects a rate of processing production storage commands on production storage volumes relative to the rate of processing test storage commands on production storage volumes. Or, another storage command metric can be a rate of processing production storage commands and test storage commands on all available volumes.

At (6), storage network 130 transmits the test storage command processing result to the host computing device 110. In some embodiments, this can be viewed as a response to the storage command sent at step (1) by the host computing device 110. Accordingly, storage command processing result can be directed to that virtual machine 112 that originally sent the storage command. As but one example, if an I/O read storage command was originally sent by virtual machine 112, the storage command processing result can be the data that was read from storage volume 134; or, in another embodiment, the storage command processing result can be an acknowledgement that the I/O read storage command was performed.

At (7), storage network 130 transmits the monitoring information to test service manager 140A. As described above with reference to FIG. 4A at (6), monitoring information can be obtained by test service manager 140A in a variety of ways. Monitoring information that includes information regarding test storage commands can be identified with a corresponding test identifier for the test storage volume 138 that processed a test storage command or the result of processing a test storage command. In various embodiments, the monitoring information regarding test storage commands can be stored in test volume data store 208.

Figure 4C:
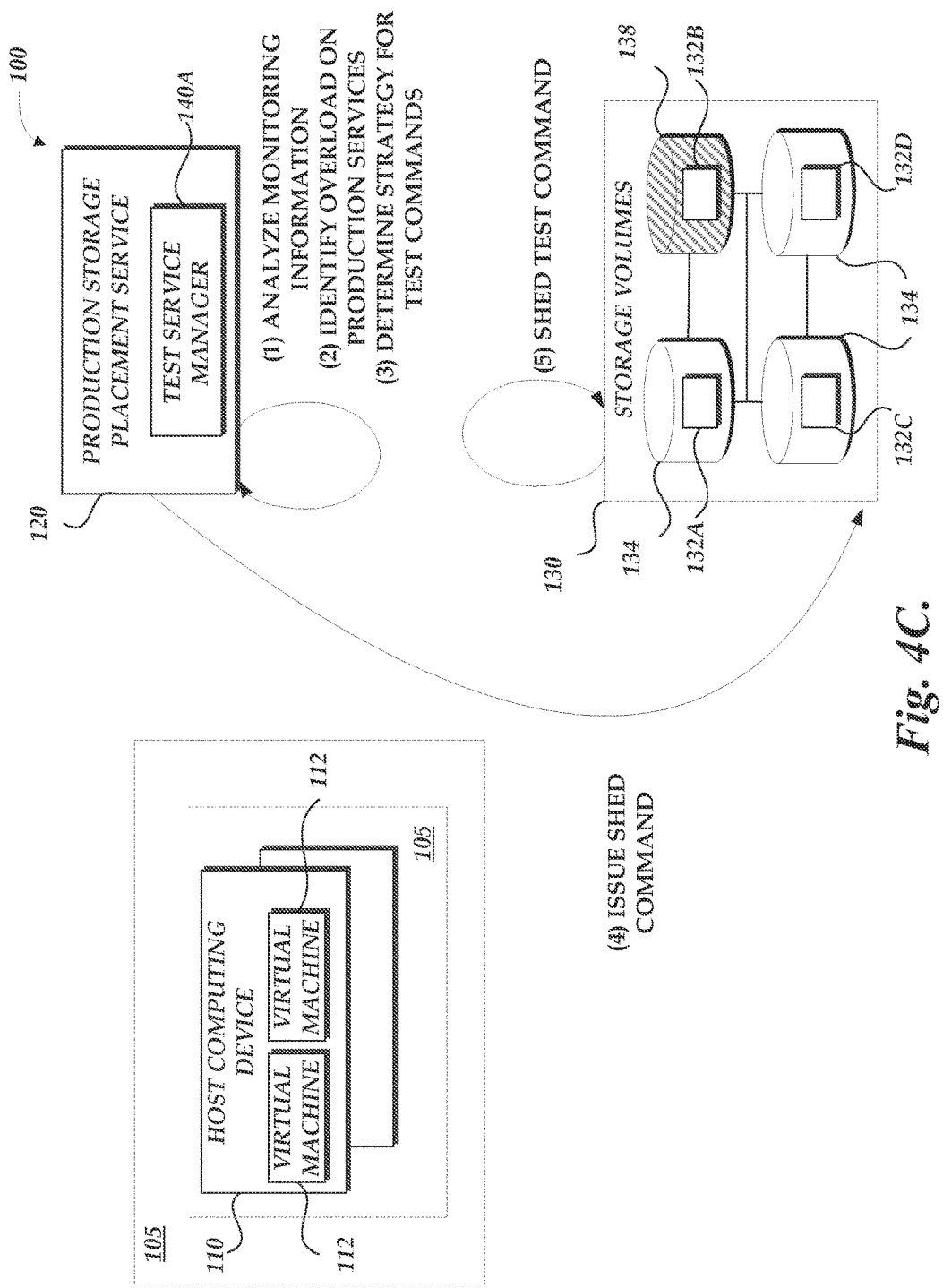
FIG. 4C is a block diagram the network topology of FIG. 1 illustrating test service manager identifying an overload on production services and transmitting a shed command to a storage network.

FIG. 4C is a block diagram the network topology of FIG. 1 illustrating test service manager identifying an overload on production services and transmitting a shed command to a storage network. At (1), the test service manager 140A can analyze the monitoring information to identify whether an overload exists on production services. A storage command metric included within the monitoring information can be compared to a threshold to determine whether a certain storage command metric indicates a storage system overload. In some embodiments, a trailing average can be computed from a storage command metric, only indicating a threshold breach if that trailing average is greater than (or less than, depending on the metric) the threshold. Such a threshold comparison can allow a storage system to be more efficient when identifying overloads. For example, each storage processing service of a storage system can have a threshold number of test storage commands to be processed by that storage processing service for a particular test identifier. Illustratively, if test storage placement service 120' has a threshold number of two hundred test storage commands for test identifier, Customer A, the test service manager 140A can identify an overload if more than two hundred test storage commands with that test identifier are processing at the test storage placement service 120', queued at the test storage placement service 120', or both processing and queued at the test storage placement service 120'. As another example, a trailing average for a rate of processing production storage commands on production storage volumes relative to the rate of processing all storage commands on all storage volumes can be computed over a period of week by adding the $n^{th}$ value of read I/O operations metric received, on Wednesday, to the sum total of all read I/O operations received since Sunday; then, dividing by n (e.g., four, if n equals a read I/O operations metric received each day). That computed trailing average can indicate an overload, in contrast to the read I/O operations received on Tuesday, which would not have breached the trailing average threshold. Accordingly, the trailing average threshold can indicate an overload where a storage command metric alone may not. Thus, the test service manager 140A can use this trailing average threshold to identify an overload on production services at (2).

As yet another example of analyzing the monitoring information using a threshold, a threshold can correspond to an upper band and a lower band. The upper band and lower bands can be computed based on the performance of the storage network 130 generally, with the bands defining unusual or statistical outlier performance. In other cases, the upper band and lower bands can be computed based on the performance of a single production storage volume 134 or a set of production storage volumes 134. A threshold breach is indicated when a metric falls outside of those bands. In one embodiment, an outlier is identified because it falls below a performance threshold computed using various statistical processing techniques and the storage command metrics. In another embodiment, an operator of the storage system can define the threshold (e.g., a user-defined threshold) so that the operator is notified if a certain storage command metric breaches the threshold. As can be seen from this description, various thresholds can be employed to allow test service manager 140A to identify an overload, allowing a storage system to better indicate overloads on production services. In some cases, analyzing the monitoring information and identifying an overload on production services can make a storage system more efficient because it uses less processing time or processing power, resulting in a cost savings by hardware and/or power.

At (3), the test service manager 140A determines a strategy for test storage commands and test storage volumes. For example, the test service manager 140A can determine that a strategy for any test storage commands is to shed the test storage commands if the monitoring information indicates that an overload exists on production storage volumes. Such a strategy can also be referred to as alternatively processing the test storage commands. In various embodiments, test storage commands can be alternatively processed, instead of being queued or shed. For example, the test storage commands can be sent to another test storage system, separate from storage layer 113, to be tested independently of production services. As another example, the test service manager 140A can determine that a strategy for some test storage volumes is to remove a test identifier associated with the storage volumes if the monitoring indication indicates that an overload exists on production storage volumes. In this way, a test storage volume can be reclassified as a production storage volume to alleviate the overload existing on the other production storage volumes. As yet another example, the test service manager can determine that test storage commands should be queued at production services to which they are routed until the test manager 140A has determined that an overload does not continue to exist. Aspects of this determination will be described with respect to FIGS. 4D-4E.

Continuing with reference to FIG. 4C at (4), test service manager 140A can issue the shed command so that any additional test storage commands are shed or queued. Test manager 140A can issue such a shed command when an overload has been identified on production services. Such a shed command can be useful for a storage processing service that experiences peak usage times on production services. For example, at certain times, production storage commands can increase beyond the available capacity of the storage volumes provisioned for both production services and test services. At those times, processing test storage commands may be a lower priority for the data center operator. For example, processing further test storage commands could add a significant overhead, possibly degrading performance by the storage system for production services. In contrast, because production services can reflect actual customer demand for the storage volumes, it may be desirable to shed test storage commands associated with ongoing tests (e.g., tests on storage volumes provisioned for production services). In other embodiments not depicted in FIG. 4C, the test service manager can issue a command to alternatively process the test storage commands. As described above, this can be a command to process any test storage commands in storage layer 113 at a separate testing storage system. For example, the test service manager 140A can route the test storage commands via network 122 to a separate testing storage system.

At (5), storage network 130 can shed any test storage commands as indicated by the shed command. Shedding a test storage command can correspond to dropping the test storage command from the storage network 130. For example, a test storage command can be in the processing queue of the test service or the corresponding test storage volume 138 that test service is executing the test storage command on. The test storage command can be dropped or shed from the processing queue of the test service. In other embodiments, if the test storage command is being processed on a production service, the test storage command can be dropped from a processing queue of the production service. The shed command can also indicate that test storage volumes are to be shed. This can correspond to removing a test identifier associated with the test storage volume 138. In such a case, the test identifier associated with test storage volume 138 may be removed. Accordingly test storage volume 138 can now be used a production storage volume to alleviate the overload on production services to which the shed command has been made active by test manager 140A.

Figure 4D:
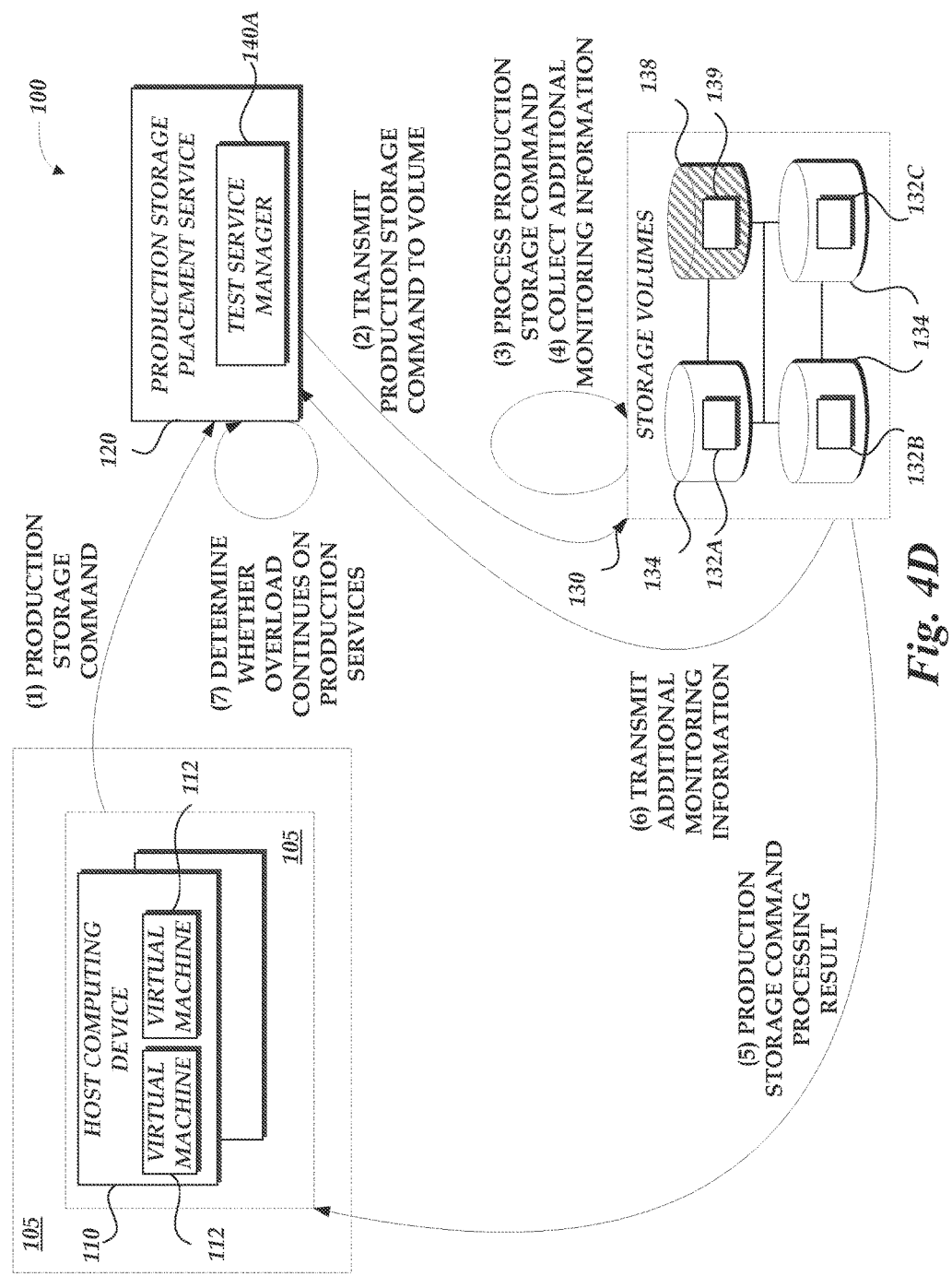
FIG. 4D is a block diagram the network topology of FIG. 1 illustrating transmission of and processing of a production storage command when a shed command is active.

FIG. 4D is a block diagram the network topology of FIG. 1 illustrating transmission of and processing of a production storage command when a shed command is active. As will be illustrated, with a shed command is active at the storage network 130, production storage commands can process on the storage volumes 134 and test storage volume 138 to alleviate the overload that has been identified by test service manager 140A on production services. As illustrated in FIG. 4D at (1), a production storage command is sent from host computing device 110. At (2), production storage placement service 120 transmits the production storage command to a production storage volume in storage network 130. At (3), storage network 130 processes the production storage command. A production storage command may require processing on multiple storage volumes 134 or a single volume 134. With the shed command being active, the production storage command can also process on test storage volume 138, with the test identifier of test storage volume previously been removed as was described with reference to FIG. 4C.

Next, at (4), storage network 130 collects monitoring information based on the production storage commands processed. Taken together with the illustrations described in FIGS. 4A-4C, this can be viewed as collecting additional monitoring information while the shed command issued by a test storage manager 140A is active. As an example, a storage command metric included in the additional monitoring information can be a rate of processing production storage commands on all available storage volumes at storage network 130.

At (5), storage network 130 transmits the production storage command processing result to the host computing device 110. In some embodiments, this can be viewed as a response to the production storage command sent at step (1) by the host computing device 110. At (6), storage network 130 transmits the additional monitoring information to test service manager 140A. As described above with reference to FIG. 4A, monitoring information can be obtained by the test service manager 140A from a variety of sources within the storage layer 113 or within the client layer 102.

Continuing with reference to FIG. 4D, at (7), the test service manager 140A determines whether the overload continues to exist on production services using the additional monitoring information. In the illustrative example, a test service manager 140A can determine that the storage traffic overload continues to exist on the storage processing service. Accordingly, test service manager 140A can allow the shed command to continue being active at storage network 130. Or in other embodiments not depicted, if the initial shed command has a timer, test service manager 140A can transmit another shed command to queue or any test storage commands.

Figure 4E:
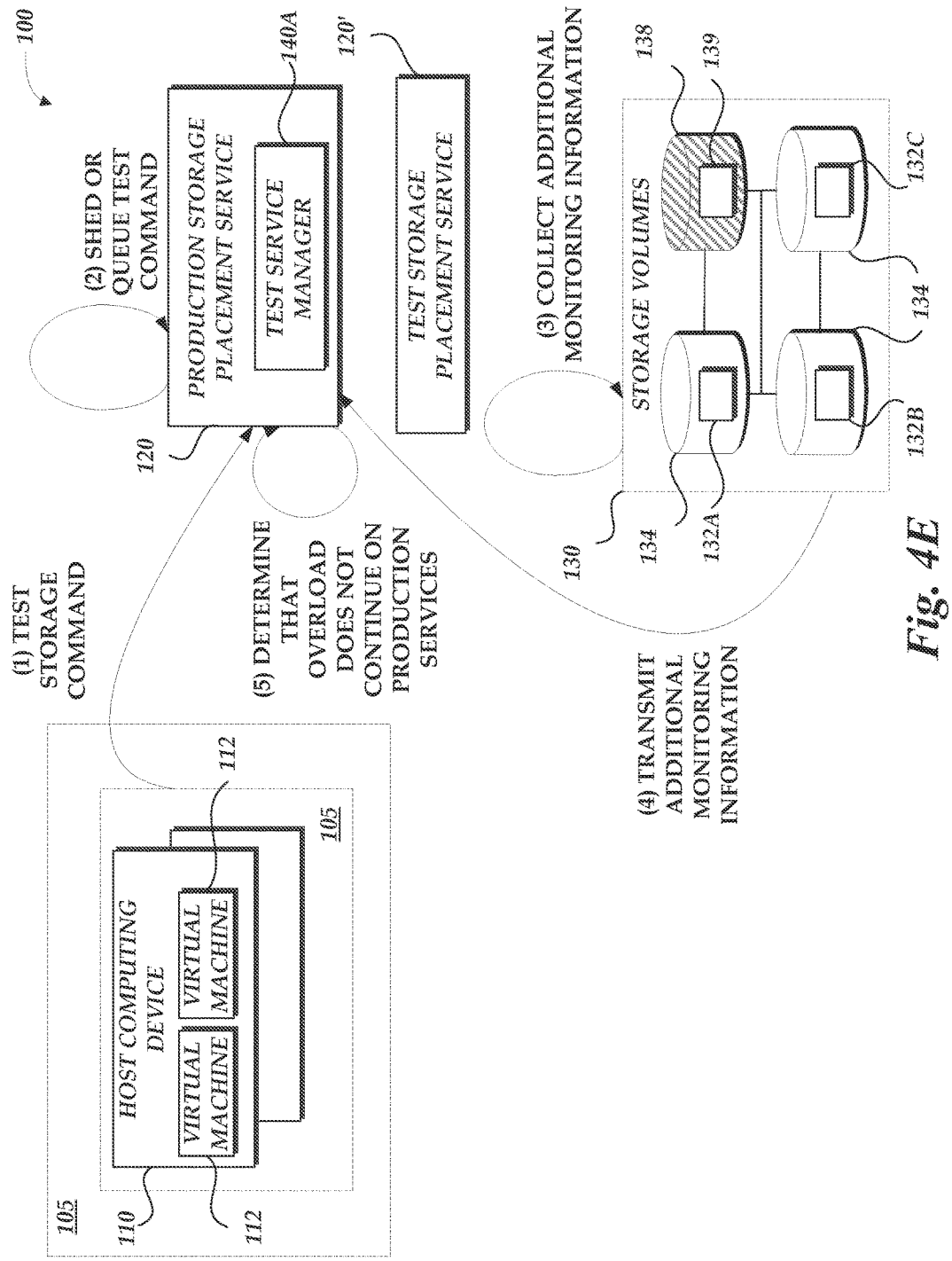
FIG. 4E is a block diagram the network topology of FIG. 1 illustrating shedding or queuing of a test storage command when a shed command is active.

FIG. 4E is a block diagram the network topology of FIG. 1 illustrating shedding or queuing of a test storage command when a shed command is active. As illustrated in FIG. 4E at (1), a test storage command (e.g., a test storage placement request) is sent from host computing device 110. At (2), production storage placement service 120 receives the test storage command and, because a shed command issued by the test service manager 140A is active, immediately sheds or queue the test storage command. For example, production storage placement service can have a queue associated with a test identifier where test storage commands associated with that test identifier can be queued. Various queues are possible. For example, a queue length can vary based on the test identifier. In this way, the storage layer 113 can queue test storage commands based on a customer or user associated with the test identifier. Test storage commands can also be shed or dropped from the production storage placement service altogether. In this case, in contrast to the illustrative transmission and processing of a test storage command depicted in FIG. 4B, the test storage command is not routed to test storage placement service 120'. Instead, test storage commands or queued or shed until the test service manager 140A determines that an overload does not exist, and thereby indicates that the storage layer 113 should resume testing. Or, in other embodiments, a shed command associated with a timer may expire, in which case, testing would resume.

At (3), storage network 130 collects additional monitoring information Taken together with the illustrations described in FIGS. 4A-4D, this can be viewed as collecting additional monitoring information while the shed command issued by a test storage manager 140A is active. At (4), storage network 130 transmits the additional monitoring information to test service manager 140A. As described above with reference to FIG. 4A, monitoring information can be obtained by the test service manager 140A from a variety of sources within the storage layer 113 or within the client layer 102.

Continuing with reference to FIG. 4E, at (5), the test service manager 140A determines that the overload does not continues to exist on production services using the additional monitoring information. For example, the test service manager 140A can analyze the additional monitoring information to identify that the storage traffic overload on the storage processing service does not continue to exist. In such a case, the test service manager 140A can determine that testing of storage commands can resume. In some cases, the test service manager 140A can determine that testing should only resume for a certain period of time. In which case, a subsequent shed command can be issued by the test service manager 140A. For example, peak periods of storage layer 113 usage can be used to determine when shed commands can be issued or when testing can resume. Accordingly, test service manager 140A can send an indication that testing should resume. Testing can resume as depicted in FIG. 4B. In various embodiments, the production storage placement service 120 may route any test storage commands in a queue of the production storage placement service 120 to the test storage placement service 120'. After processing of the test storage commands that had been queued during a queue command, test storage placement service 120' can resume testing of additional test storage commands received.

In embodiments not depicted, the test service manager 140A can transmit a command to tag a storage volume in storage network 130 as a test storage volume. In this way, the test service manager 140A can associate an available storage volume with a test identifier. Accordingly, storage volume tagged as a test storage volume can be used for processing of test storage commands associated with the test identifier.

Figure 5:
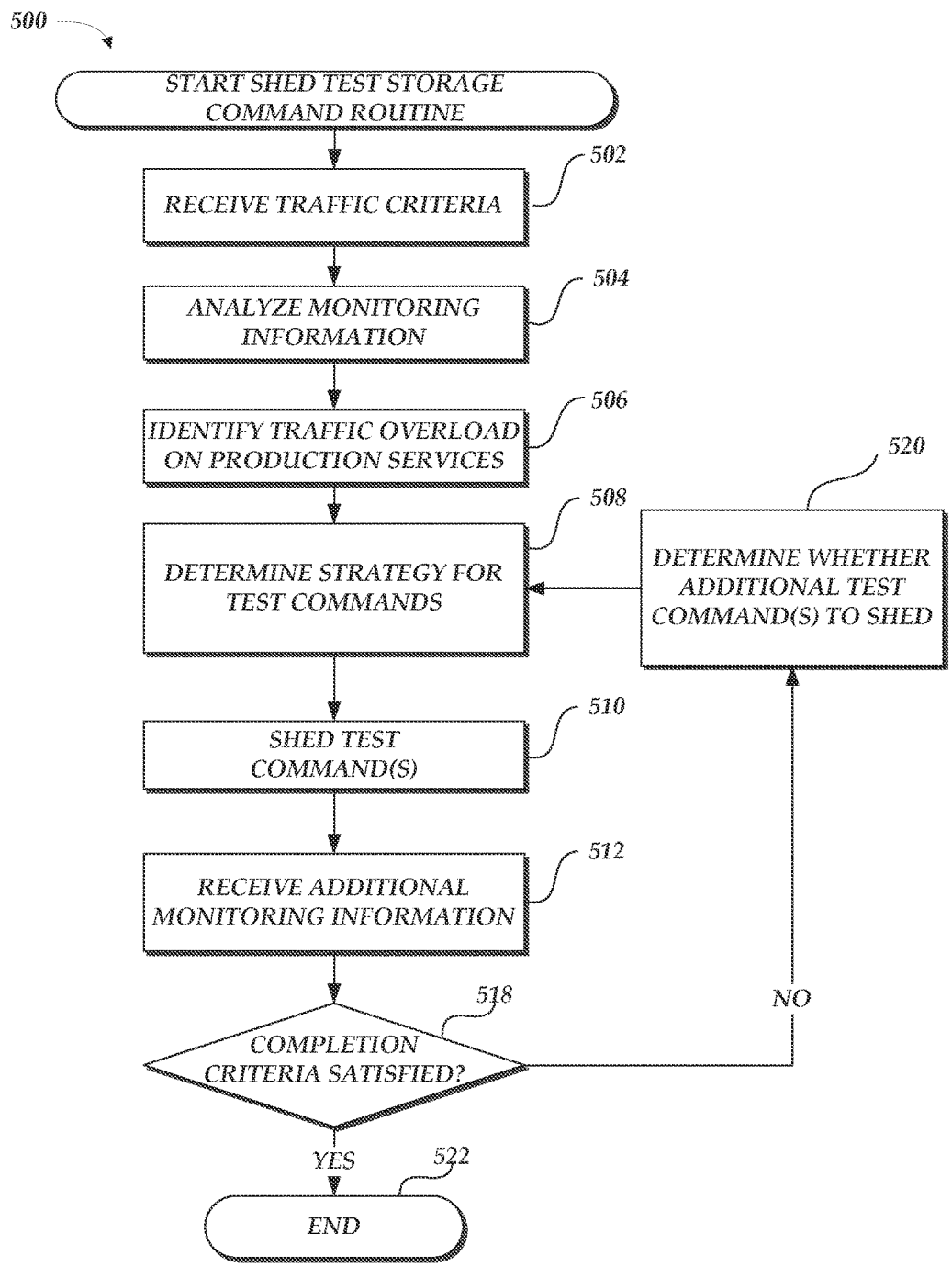
FIG. 5 is a flow diagram of an illustrative shed test storage command routine implemented by a test service manager.

FIG. 5 is a flow diagram of an illustrative shed test storage command routine 500 implemented by a test service manager. The test service manager can be a test service manager as described with reference to the test service manager 140, 140A, 140B in system 100. Routine 500 begins at block 502 where traffic criteria are received by the test service manager 140, 140A, 140B. Traffic criteria can be a rate of production storage volume traffic relative to a rate of test storage volume traffic. Traffic criteria can be different for specific test identifier associated with various users or customers. In various embodiments, the traffic criteria can be thresholds for indicating an overload as discussed above with reference to FIG. 4C at (1).

Next at block 504, the test service manager 140, 140A, 140B can analyze the monitoring information using the traffic criteria. For example, a traffic criterion can be comparing a rate of production storage traffic for a customer to a rate of test storage traffic for a customer. If the rate of production storage traffic is greater than a threshold amount of traffic for that customer, the traffic criteria can indicate that a traffic overload exists on production services. In various embodiments, analyzing the monitoring information can be accomplished as discussed above with reference to FIG. 4C at (2).

At block 508, the test service manager 140, 140A, 140B can determine a strategy for the test storage commands. In various embodiments, determining a strategy for the test storage commands and the test storage volumes can be accomplished as discussed above with reference to FIG. 4C at (3). At block 510, the test storage manager 140, 140A, 140B can shed test storage commands. In various embodiments, shedding the test storage commands for the test storage volumes can be accomplished as discussed above with reference to FIG. 4C at (5). At block 512, the test service manager 140, 140A, 140B receives additional monitoring information. In various embodiments, receiving additional monitoring information can be accomplished as discussed above with reference to FIG. 4D at (6) or FIG. 4E at (4).

Thereafter, at decision block 518, the test service manager 140, 140A, 140B can determine whether a set of completion criteria are satisfied. Completion criteria may be determined by the test service manager 140, 140A, 140B, or may be manually specified. For example, completion criteria may allow a routine to complete where a rate threshold indicates that an overload does not continue to exist on production services. For example, the rate threshold can be a rate of processing production storage commands on production storage volumes. Completion criteria may be a timer associated with the shed command that indicates that the shed command should no longer be active. If the set of completion criteria are satisfied, the routine 500 ends at block 522.

If however, the completion criteria are not satisfied at block 518, the flow proceeds to block 520. At block 520, the test service manager 140, 140A, 140B can determine whether additional test storage commands should be shed to alleviate the overload on production services. The flow proceeds back to block 508 where the test service manager 140, 140A, 140B can determine a strategy for the test storage commands and the test storage volumes. For example, the test service manager 140, 140A, 140B can determine that a test identifier associated with a test storage volume 138 should be removed from the look-up table stored in test volume data store 208. Routine 500 proceeds through the flow as described above until the completion criteria are satisfied at decision block 518. Thereafter, the routine 500 ends at block 522.

In various embodiments, routine 500 may be performed by a test service manager 140, 140A, 140B of a storage system. In other embodiments, a physical computing device with computer-executable instructions may cause the computing device to perform routine 500. In some embodiments of the routine 500, elements may occur in sequences other than as described above. In such embodiments, the routine 500 may, for example, omit block 504. Accordingly, monitoring information can be dynamically provided to a test service manager 140, 140A, 140B. One skilled in the art will appreciate that additional variations are possible and within the scope of the present disclosure.

Figure 6:
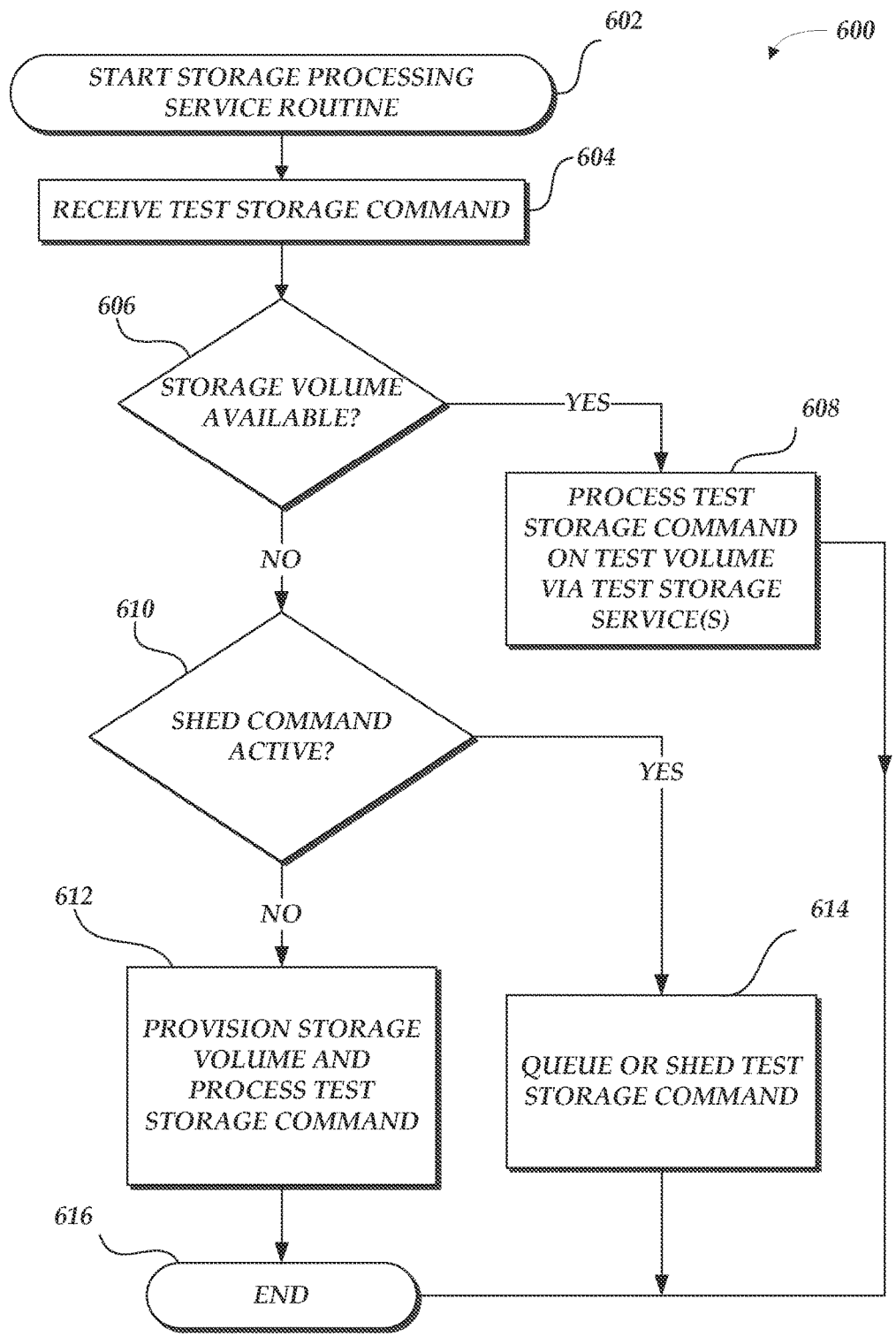
FIG. 6 is a flow diagram of an illustrative storage processing service routine implemented by a storage processing service.

FIG. 6 is a flow diagram of an illustrative storage processing service routine 600 implemented by a storage processing service. Routine 600 may be an optional routine implemented by a storage processing service to facilitate the processing of test storage commands. The storage processing service can be a storage layer as described with reference to the storage layer 113 in system 100. Routine 600 begins at block 602. At block 604, a test storage command is received by the storage processing service. For example, a test storage command can be received at production storage placement service 120 as depicted in FIG. 4A.

At decision block 606, the storage processing service determines whether a storage volume is available to process the test storage command. For example, the production storage placement service 120 can query the storage network 130 to determine whether a test storage volume 138 is available for processing of a test storage command. If a test storage volume is available, the flow proceeds to block 608. At block 608, the test storage command is processed on the test storage volume 138 via a test storage service. For example, the production storage placement service 120 can route the test storage command to a test storage placement service 120' which will process the test storage command on the test storage volume 138. Thereafter, the flow ends at block 616.

If however, at block 606, a test storage volume is not available, the flow proceeds to decision block 610 where a storage processing service determines whether a shed command is active. A shed command can indicate that an overload exists on production services. Accordingly, if a shed command is active, the flow proceeds to block 614, where the test storage command is queued or shed. In various embodiments, shedding the test storage commands for the test storage volumes can be accomplished as discussed above with reference to FIG. 4C at (5). Thereafter, the flow ends at block 616.

If however, at block 610, a shed command is not active the flow proceeds to block 612. At block 612, the storage processing service can transmit a request to test service manager 140 to provision an available storage volume, and, subsequently, process the test storage command. For example, the test storage command may be processed on production or test services using the provisioned storage volume. In such a case, the test service manager 140, 140A, 140B can associate a test identifier with an available storage volume to tag it as a test storage volume 138. Thereafter, the flow ends at block 616.

In various embodiments, routine 600 may be performed by a test service manager 140, 140A, 140B of a storage system. In other embodiments, a physical computing device with computer-executable instructions may cause the computing device to perform routine 600. In some embodiments of the routine 600, elements may occur in sequences other than as described above. In such embodiments, the routine 600 may, for example, omit block 612. Accordingly, testing can resume without tagging an available storage volume, for example, if a test storage volume 138 is associated with the test identifier of the test storage command is already available. One skilled in the art will appreciate that additional variations are possible and within the scope of the present disclosure.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

All of the processes described herein may be embodied in, and fully automated via, software code modules executed by one or more computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
 a storage processing service comprising at least one production storage volume and at least one test storage volume, the storage processing service executed on one or more storage computing devices and configured to:
  obtain a first storage request from one of a plurality of virtual computing instances, the first storage request comprising at least one production storage request or at least one test storage request;
  determine that the first storage request includes a tag indicative that a production service is to be instantiated for further processing of the first storage request;
  route the first storage request to the instantiated production service;
  process the first storage request on the instantiated storage production service to generate a first production storage processing result, wherein the instantiated production service is a modification to the production service or another production service, and the test storage command is implemented, at least in part, by resources on the production computing environment;
  obtain a second storage request from one of the plurality of virtual computing instances, the second storage request comprising at least one production storage request or at least one test storage request;

determine that second storage request includes a tag indicative that a non-test production storage service is to be instantiated for further processing of the second storage request;

route the second storage request to the instantiated non-test production storage service; and process the second storage request to generate a second production storage processing result.

2. The system of claim 1, wherein the storage processing service is further configured to collect monitoring information based, in part, on the first production storage processing result and the second production storage processing result.

3. The system of claim 2, wherein the storage processing service is further configured to store the monitoring information and tag information in a non-volatile data store of the storage processing service.

4. The system of claim 2, wherein a test service manager, executed on one or more computing devices, is configured to:

analyze the monitoring information to identify a storage traffic overload on the storage production service; and determine that the storage production service is to stop test storage requests.

5. The system of claim 1, wherein the storage processing service is further configured to:

obtain a third production storage request from one of a plurality virtual computing instances, the third storage request comprising at least one production storage request or at least one test storage request;

determine that third storage request includes a tag indicative that a test production storage service for further processing of the third storage request;

routing the third storage request to the instantiated non-test production storage service; and processing the third storage request to generate a third production storage processing result.

6. A computer-implemented method for processing test storage commands on a storage processing service comprising a production service in a production computing environment, the computer-implemented method comprising:

obtaining, at the production service associated with the storage processing service, multiple storage commands comprising at least one production storage command and the at least one test storage command;

analyzing the multiple storage commands to identify a tag included in each of the multiple storage commands indicating that a particular storage command is a production storage command or a test storage command;

routing the at least one production storage command to the production service based at least in part on the tag included in the at least one production storage command indicating that the storage command is a production storage command; and routing the at least one test storage command to a test service based at least in part on the tag included in the at least one test storage command indicating that the storage command is a test storage command, wherein the test service is a modification to the production service or another production service, and the test storage command is implemented, at least in part, by resources on the production computing environment.

7. The computer-implemented method of claim 6 further comprising:

processing, at a storage network associated with the production service, the multiple storage commands to generate at least one production storage processing result and at least one test storage processing result; and collecting, at the storage network, monitoring information based at least in part on the at least one production storage result and the at least one test storage processing result.

8. The computer-implemented method of claim 6, wherein analyzing the multiple storage commands for information indicating that the particular storage command is the production storage command or the test storage command comprises determining that the at least one storage command is associated with a test identifier, wherein the test service is associated with the test identifier.

9. The computer-implemented method of claim 7 further comprising:

analyzing the monitoring information to identify a storage traffic overload on the storage processing service, the storage traffic overload corresponding to an overload of production storage commands on a threshold level of storage volumes;

determining that the storage processing service is to halt testing for a period of time; and transmitting a command to alternatively process test storage commands to the storage processing service.

10. The computer-implemented method of claim 9 further comprising:

obtaining additional monitoring information, wherein the additional monitoring information is collected based at least on processing at least one additional production storage command;

analyzing the additional monitoring information to identify that the storage traffic overload on the storage processing service continues to exist; and processing, at the storage processing service, additional production storage commands.

11. The computer-implemented method of claim 10, wherein analyzing the additional monitoring information to identify that the storage traffic overload on the storage processing service continues to exist comprises determining that completion criteria for assessing whether the storage traffic overload exists is not satisfied, wherein the completion criteria comprises a threshold production rate corresponding to a rate of processing the production storage commands.

12. The computer-implemented method of claim 9 further comprising:

obtaining additional monitoring information, wherein the additional monitoring information is collected based at least on processing at least one additional production storage command;

analyzing the additional monitoring information to identify that the storage traffic overload on the storage processing service does not continue to exist; and resuming testing of test storage commands.

13. The computer-implemented method of claim 6, wherein routing the at least one test storage command to the test service comprises:

receiving an API-level request comprising a test identifier; and determining that the test identifier indicates the at least one test storage command is to be processed on at least one additional production service associated with the storage processing service.

14. The computer-implemented method of claim 13, wherein routing the at least one test storage command to the test service further comprises:

transmitting routing information indicating that the test storage command is to be processed on the test service and the at least one additional production service;

transmitting additional routing information indicating that any received production storage commands are to be processed on the additional production service substantially concurrently with the test storage command.

15. The computer-implemented method of claim 6, wherein the storage processing service comprises one or more storage computing devices configured to obtain at least one of the multiple storage requests from a virtual computing device instance, the virtual computing device instance configured to transmit production storage commands and test storage commands via a communications network, the virtual computing device instance executing on behalf of a client computing device, and the virtual computing device instance hosted on a host computing device.

16. A non-transitory computer-readable storage medium including computer-executable instructions comprising:
   computer-executable instructions that, when executed by a computing device associated with one or more client computing devices:
      obtain at least one production storage command and at least one test storage command;
      process the at least one production storage command and the at least one test storage command, the processing comprising identifying a tag included in each of the storage commands indicating that a particular storage command is a production storage command or a test storage command;
      characterize the at least one production storage command and the at least one test storage command based on the tag included in the at least one production storage command and the tag included in the at least one test storage command;
      determine that the at least one test storage command is to be processed on a test service, the test service instantiated in a production service; and
      transmit routing information for the test storage command to be processed by the test service instantiated in the production service.

17. The non-transitory computer-readable storage medium of claim 16, wherein the production service corresponds to at least one of a storage placement service, a volume metadata service, or a replication service.

18. The non-transitory computer-readable storage medium of claim 16 further comprising:
   receive a routing request for the test storage command from the storage processing service;
   determine that the test storage command is associated with a test identifier of an application-level ("API-level") request; and
   determine that the test storage command is to be routed to a test service associated with the production service, wherein the test service is configured, in part, by the API-level request.

19. The non-transitory computer-readable storage medium of claim 18, wherein the routing information indicates that a test storage volume of the test storage service is to process the test storage command, wherein the test storage command is associated with the test identifier.

20. The non-transitory computer-readable storage medium of claim 16 further comprising:
   obtain monitoring information regarding additional multiple storage commands executing on the storage processing service;
   determine that a processing overload does exist on the storage processing service;
   determine that the storage processing service is to not continue testing for a period of time; and
   issue a command to shed any additional test storage commands.

21. The non-transitory computer-readable storage medium of claim 20 further comprising:
   receive a request to route an additional test storage command from the production service; and
   transmit additional routing information indicating that the additional test storage command is to be shed from a processing queue of the production service, the test service associated with storage processing service.

\* \* \* \* \*